(12) United States Patent
Burns et al.

(10) Patent No.: US 6,506,823 B2
(45) Date of Patent: Jan. 14, 2003

(54) NITROCELLULOSE BASED COATING COMPOSITIONS

(75) Inventors: Elizabeth G. Burns, Windham, NH (US); Charles C. Shearer, Acton, MA (US)

(73) Assignee: Raffi & Swanson, Incorporated, Wilmington, MA (US)

( * ) Notice: Subject to any disclaimer, the term of this patent is extended or adjusted under 35 U.S.C. 154(b) by 0 days.

(21) Appl. No.: 09/754,508

(22) Filed: Jan. 4, 2001

(65) Prior Publication Data

US 2002/0132885 A1 Sep. 19, 2002

(51) Int. Cl.[7] .................. C08G 63/78; C08G 63/82; C08G 63/87
(52) U.S. Cl. .................. 524/35; 528/271; 528/274; 428/532
(58) Field of Search ............................ 524/35; 528/271, 528/274; 428/532

(56) References Cited

U.S. PATENT DOCUMENTS

| 3,749,592 A | * | 7/1973 | Gaske et al. .................. 117/62 |
| 4,565,857 A | | 1/1986 | Grant |
| 4,656,202 A | * | 4/1987 | Nason et al. .................. 522/89 |
| 4,855,184 A | | 8/1989 | Klun et al. |
| 5,496,589 A | | 3/1996 | Igarashi et al. |
| 6,057,033 A | | 5/2000 | Bilodeau |

* cited by examiner

Primary Examiner—Kriellion A. Sanders
(74) Attorney, Agent, or Firm—Barry R. Blaker

(57) ABSTRACT

A curable nitrocellulose based coating composition having four essential components: nitrocellulose, polymerizable reactive diluents whose homopolymers have glass transition temperatures both above and below 25° C. and acrylated urethane. The composition may also contain an initiator whereby thermal or light curing of the composition can be achieved.

20 Claims, No Drawings

NITROCELLULOSE BASED COATING COMPOSITIONS

BACKGROUND OF THE INVENTION

1. Field of the Invention

The present invention relates broadly to nitrocellulose based coating compositions and is more particularly directed to such coating compositions possessed of low concentrations of Volatile Organic Compounds (hereinafter, "VOC").

In the field of industrial finishing, particularly wood finishing, it is highly desirable that the coating compositions employed be rapidly curable to the finished state, thereby to minimize the time and expense required to produce finished coatings on the product to which the coating is applied. Industrial wood finishing involves protective coatings for such diverse products as furniture, cabinetry, joinery, millwork, flooring and miscellaneous coatings such as pencil lacquers, tool handle finishes, finishes for baseball bats and gun stocks. Traditional polymer based coating compositions are generally possessed of one or more detrimental characteristics which mitigate against their use in industrial finishing operations. Nitrocellulose lacquers are normally high in VOC and Hazardous Air Polluting Substances (hereinafter, "HAPS") and are often slow to dry. Acid catalyzed nitrocellulose coating compositions are normally high in VOC and HAPS and, moreover, have finite pot lives requiring that the catalyzed batches thereof be entirely used within the alloted pot life. Alkyd urea compositions require heating and are generally slow to cure. Two part polyurethanes have finite pot lives and, while the coatings thereof are generally tough, they are often poor in sandability. Cellulose acetate butyrate compositions exhibit relatively low performance as protective coatings and, moreover, are high in VOC and HAPS. Oil modified polyurethanes are generally slow to cure and, in addition, often display relatively poor color properties. Moisture cured uralkyd coating compositions are slow to cure and are high in VOC. Acrylic coating compositions, which can be either solvent based or waterborne, generally provide finished coatings which, while sandable, are usually not tough and have poor resistance to scratching. When of the solvent based type, acrylic coating compositions also have high concentrations of VOC. Waterborne acrylic coatings are generally slow to dry, have limited aesthetic properties and tend to rust ferrous metal surfaces or to raise the fibers of wooden surfaces to which they are applied. Energy cured coating compositions, such as ultraviolet light or electron beam cured compositions have become more common in some industrial finishing markets. However, they, too, suffer from some limitations. For instance, urethane-acrylate compositions generally result in coatings which have relatively poor aesthetics and which have only poor to fair sandability. Epoxy coatings can display poor color characteristics and tend to yellow over time. Ultraviolet light cured acrylic coatings are not scratch resistant and have high shrinkage, thereby leading to poor adhesion to the substrate and facile crack propagation once the coated film is damaged. Acrylated urethanes can be employed to increase the toughness of acrylic coatings. However, the resulting coated films have poor sandability and hardness. Energy cured waterbased coatings must be dried prior to curing and, moreover, are possessed of the same rusting and fiber raising deficiencies mentioned above.

2. Description of Related Art

U.S. Pat. No. 5,496,589, Igarashi et al., issued Mar. 5, 1996 and assigned to Toagosei Chemical Industry Co., Ltd., discloses a radiation curable wood impregnant composition. This composition is made using long alkyloxy chains on methacrylates and is cured using ultraviolet (UV) or electron beam (EB) radiation. The cured impregnant composition is said to cure to a hardness of only about 4H.

U.S. Pat. No. 4,855,184, Klun et al., issued Aug. 8, 1989 and assigned to Minnesota Mining and Manufacturing Company, discloses a radiation curable protective coating composition which is applied in a solution of 40% butyl acetate, 20% propyl acetate and 20% n-propanol. Thus, the VOC concentration of the composition is high.

U.S. Pat. No. 4,565,857, R. J. Grant, issued Jan. 21, 1986 and assigned to Minnesota Mining and Manufacturing Company, discloses a radiation curable protective coating composition whose resinous content is comprised of cellulosic materials which are treated with isocyanatoethylmethacrylate in order to confer radiation curability thereto. The resin is coated onto a surface as a solution in organic solvents. Thus, the VOC concentration of the composition is high.

U.S. Pat. No. 6,057,033, W. L. Bilodeau, issued May 2, 2000 and assigned to Avery Dennison Corporation, discloses the use of cellulosic fibers and polyorganosilanes in the preparation of radiation curable release coating compositions. The resulting compositions are, therefore, low-surface energy coatings and their adhesion to substrates is inadequate to serve as protective coatings for the substrate.

OBJECTS OF THE INVENTION

It is a principal object of the invention to provide novel nitrocellulose based coating compositions.

It is another object of the invention to provide nitrocellulose based coating compositions having low VOC concentrations.

It is yet another object of the invention to provide nitrocellulose based coating compositions whose applied films are rapidly curable to the finished state.

It is still another object of the invention to provide nitrocellulose based coating compositions whose cured applied films have good adhesion and surface hardness properties.

It is another object of the invention to provide nitrocellulose based coating compositions whose cured applied films have good aesthetic and protective qualities.

It is another object of the invention to provide novel protective films formed from the nitrocellulose based coating compositions hereof.

Other objects and advantages of the present invention will, in part, be obvious and will, in part appear hereinafter.

BRIEF SUMMARY OF THE INVENTION

The coating compositions of the invention broadly comprise the following four components: nitrocellulose, a polymerizable reactive diluent whose homopolymers have a glass transition temperature of less than 25° C.; a polymerizable reactive diluent whose homopolymers have a glass transition temperature of greater than 25° C. and an acrylated urethane. The compositions of the invention comprise between about 3 and about 25 percent by weight of the nitrocellulose component; between about 10 and about 50 percent by weight of the polymerizable reactive diluent component whose homopolymers have a glass transition temperature of less than 25° C.; between about 25 and about 75 percent by weight of the polymerizable reactive diluent component whose homopolymers have a glass transition temperature of greater than 25° C and between about 5 and about 40 percent by weight of the acrylated urethane component. The compositions of the invention may also include between about 0.5 and about 5 percent by weight of thermal and/or photoinitiators and up to about 5 percent by weight of conventional coating composition additives. The protective films of the invention comprise the cured reaction products of the foregoing compositions.

DETAILED DESCRIPTION OF THE INVENTION

Nitrocellulose is the product of nitration of the hydroxyl groups on natural cellulose fibers. Preferably, in the practice of the present invention the nitrocellulose component utilized will be from about 10% to about 12.5% nitrated, thereby to maximize solubility of the nitrocellulose component in the reactive diluent components. The viscosity of the nitrocellulose component can reside within the range of commercially available nitrocellulose materials. The viscosity of nitrocellulose is conventionally provided in seconds and is tested in accordance with the standard method of ASTM Specification D301-50. Highly viscous nitrocellulose materials have viscosities within the range of about 30 and about 50 seconds while low viscosity materials have viscosities of less than one second. We generally prefer that the nitrocellose component of the compositions of the present invention have a viscosity of less than about 20 seconds and, of even greater preference, of less than about 1 second.

Because dry nitrocellulose is a highly flammable powder it is conventionally sold "wet" with a liquid in order to prevent dusting. Generally speaking, the wetting liquids commericially employed are water, isopropanol, ethanol and butanol. Other liquids, such as plasticizers, can also be utilized as the wetting liquid. Accordingly, it should be noted and understood that, for purposes of the present invention, the weight percentages of the nitrocellulose component spoken of herein refer to the commercially available "wet" nitrocellulose materials and not to the dry powder. Nitrocellulose materials suitable for use in the present invention are currently available from such sources as: Hegadorn, Osnabruck, Germany; ICI, Wilmington, Del.; Bayer, Wolfsrude, Germany; Bergerac NC, Bergerac, France and Green Tree, Parlin, N.J.

Reactive diluents utilized in the compositions of the present invention are typically monomeric compounds polymerizable by free radical reactions. They may be monofunctional, difunctional, trifunctional or have four or more reactive sites. As previously mentioned the reactive diluents of the invention are divided into two classes, those whose homopolymers have a glass transition temperature, $T_g$, of greater than 25° C. and those whose homopolymers have a $T_g$ of less than 25° C. Glass transition temperatures are typically measured by differential scanning calorimetry and are indicated by a change in the amount of energy necessary to increase the temperature of the polymer sample by 1° C. This change is typically attributed to the onset of motion within the polymer chain. The amounts of the reactive diluents employed in the nitrocellulose coating compositions of the invention are balanced to yield good coating properties in the cured films. For example, the amount of "hard" or high $T_g$ reactive diluent is sufficient to yield good scratch and abrasion resistance while the amount of "soft" or low $T_g$ reactive diluent is sufficient to provide the cured film with good adhesion to the substrate. Thus, once the specific components of a proposed coating composition within the scope of the invention have been chosen, precise balancing of the amounts of reactive diluents employed to optimize coating properties can be readily achieved experimentally.

Exemplary suitable reactive diluents for use in the invention are as follows (numbers in parentheses represent number of repeat units).

Reactive Diluents Whose Homopolymers Have $T_g$s of Less Than 25° C.

Monofunctional

Butyl acrylate, butyl methacrylate, 2-ethylhexyl acrylate, 2-ethylhexyl methacrylate, isooctyl acrylate, isooctyl methacrylate, octyl acrylate, decyl acrylate, octyl/decyl acrylate blends, tridecyl acrylate, caprolactone acrylate, ethoxylated nonyl phenol acrylate, propoxylated allyl methacrylate, methoxy poly(ethylene glycol)(350) monomethacrylate, methoxy poly(ethylene glycol)(550) monomethacrylate, ethoxylated hydroxyethyl methacrylate, poly(propylene glycol) monomethacrylate, alkoxylated tetrahydrofurfuryl acrylate, beta-carboxyethyl acrylate.

Difunctional

Tri(ethylene glycol) dimethacrylate, tetra(ethylene glycol) dimethacrylate, poly(ethylene glycol) dimethacrylate, poly(ethylene glycol)(600)dimethacrylate, poly(ethylene glycol)(200)dimethacrylate, tetra(ethylene glycol) diacrylate, polyethylene glycol(400)diacrylate, ethoxylated(10)bisphenol-A dimethacrylate, alkoxylated hexandiol diacrylate (HDODA), alkoxylated cyclohexane dimethanol diacrylate.

Trifunctional

Ethoxylated(10)trimethylolpropane triacrylate, ethoxylated (9)trimethylolpropane triacrylate (SR 502), propoxylated(3)trimethylolpropane triacrylate, ethoxylated (6)trimethylolpropane triacrylate, propoxylated(6) trimethylolpropane triacrylate, propoxylated(3) glyceryl triacrylate, propoxylated(15)glyceryl triacrylate, ethoxylated(15)trimethylolpropane triacrylate.

Tetrafunctional or Higher

Ethoxylated(4)pentaerythritol tetraacrylate.

Reactive Diluents Whose Homopolymers Have $T_g$s of Greater Than 25° C.

Monofunctional

Styrene, 4-styrenesulfonic acid, sodium styrene sulfonate, chloromethyl styrene, bromostyrene, vinyl pyridine, vinyl imidazole, vinyl acetate, vinyl neodecanoate, tetrahydrofurfuryl acrylate, tetrahydrofurfuryl methacrylate, isobornyl acrylate, isobornyl methacrylate, methyl acrylate, methyl methacrylate, acrylic acid, methacrylic acid.

Difunctional

Ethylene glycol dimethacrylate, 1,3-butyleneglycol diacrylate, di(ethyleneglycol) diacrylate, di(ethyleneglycol) dimethacrylate, neopentyl glycol diacrylate, triethylene glycol diacrylate, tripropylene glycol diacrylate, ethoxylated(3) bisphenol-A acrylate, cyclohexanedimethanoldimethacrylate, 1,4 butandiol diacrylate, 1,6-hexanediol diacrylate, cyclohexanedimethanonol diacrylate, di(propylene glycol) diacrylate, ethoxylated(4)bisphenol- A dimethacrylate.

Trifunctional

Trimethylol propane trimethacrylate, trimethylol propane triacrylate, tris(2-hydroxy ethyl)isocyanurate triacrylate, pentaerythritol triacrylate, ethoxylated(3) trimethylolpropane triacrylate (PHOTOMER 4095).

Tetrafunctional or Higher pentaerythritol tetraacrylate (PETA K), dipentaerythritol pentaacrylate, di-trimethylolpropane tetraacrylate, pentaacrylate ester.

In addition to the foregoing reactive diluent monomers, proprietary monomers such as the SR monomers available from Sartomer, Exton, Pennsylvania, the GENOMER line of monomers available from Rahn, Zurich, Switzerland, the PHOTOMER line of monomers available from Henkel Corporation, La Grange, Illinois or the UV-curable diluents available from Croda, Kent, United Kingdom, may also be utilized in the compositions of the present invention, provided, of course, that the $T_g$ of the homopolymer of the candidate proprietary reactive diluent monomer falls within one or the other of the two classes of reactive diluents of the invention.

Acrylated urethanes are polyurethanes which have been treated so that acrylic or methacrylic functionalities are attached. They may have from 1 to 10 acrylic or methacrylic functionalities; however, for purposes of the present invention, 2 to 5 such functionalities are preferred and 3 functionalities is most preferred. Such acrylated urethanes are commercially available from Sartomer, Croda, Rahn, UCB Radcure (EBECRYL) and other suppliers of UV-curable materials. The specific molecular structures of commercially available acrylated urethanes are often proprietary but, for purposes of the present invention, those which are substantially aliphatic in nature are generally preferred.

The coating compositions of the present invention are, of course, cured to the finished dry coating after application to a substrate. Where electron beam curing of the applied coating is to be accomplished no initiator is required. However, where UV or visible light curing is to be utilized, or when the coatings are to be cured thermally, a suitable photoinitiator, thermal initiator or a compatible combination of photo- and thermal initiators is incorporated into the composition prior to coating thereof onto the substrate. Generally speaking, such initiators are to be utilized in amounts ranging from about 0.5 to about 5% by weight of the total composition.

Suitable thermal initiators for the coating compositions of the invention include peroxy or diazo compounds. Exemplary suitable peroxy compound initiators include methyl ethyl ketone peroxide, 2,4-pentanedione peroxide, methyl isobutyl ketone peroxide, dibenzoylperoxide, t-butyl peroxyneodecanoate, t-amyl peroxy-2-ethylhexanoate, 2,5-dimethyl-2,5-di(2-ethylhexanoylperoxy)hexane, t-butyl peroxy-2,5,5-trimethylhexanoate, t-butyl peroxy-2-methylbenzoate, t-butylperoxyisopropyl carbonate, 1,1-di-(t-butylperoxy)-3,5,5-trimethylcyclohexane, 1,1-di-(t-butylperoxy)cyclohexane, 2,2-di-t-butylperoxybutane, n-butyl-4,4-di(t-butylperoxy)valerate, 2,5-dimethyl-2,5-di(t-butylperoxy)hexane, di-(2-t-butylperoxyisopropyl) benzene, dicumylperoxide, di-t-butylperoxide, di-(t-butylcyclohexyl)peroxydicarbonate, di-(2-ethylhexyl) peroxydicarbonate, cumylhydroperoxide, diisobutyryl peroxide, cumylperoxyneodecanoate, 2,4,4-trimethylpentyl-2-peroxyneodecanoate, t-amylperoxyneodecanoate, di-(s-butyl)peroxydicarbonate, t-butyl peroxyneodecanoate, di-(4-t-butylcyclohexyl)peroxydicarbonate, di-(2-ethylhexyl) peroxydiacronate, dimyristyl peroxydicarbonate, t-amyl peroxypivalate, t-butyl peroxypivalate, t-amyl peroxy-2-ethylhexanoate, dibenzoyl peroxide, 1,1,-di-(t-butylperoxy) cyclohexane, 2,2-bis 4,4-di(t-butylperoxycyclohexyl) propane , t-butyl peroxy-2-methylbenzoate, 2,2,-di(t-butylperoxy)butane, di-t-butyl diperoxyazelate, t-butylperoxy isopropyl carbonate, t-amyl peroxybenzoate, t-butyl peroxybenzoate di-t-butyl diperoxyphthalate, di-(t-butylperoxyisopropyl)benzene, 2,5-dimethyl-2,5-di(t-butylperoxy)hexane, 1,4-di-(2-t-butylperoxyisopropyl) benzene, t-butylcumylperoxide, 2,5-dimethyl-2,5-di-(t-butylperoxy)hex-3-yne, di-t-butylperoxide, 2,4,4-trimethylpentyl-2 hydroperoxide, diisopropylbenzene monhydroperoxide, cumyl hydroperoxide, t-butyl hydroperoxide, t-amyl hydroperoxide, diacetyl peroxydicarbonate, dioctanoyl peroxide, didecanoyl peroxide, t-butyl peroxydiethylacetate, t-butyl peroxyisobutyrate, t-amyl peroxyacetate, t-amylperoxy-2-ethylhexylcarbonate, t-butylperoxystearylcarbonate, t-butyl-3-isopropenylcumylperoxide, di-t-amylperoxide, di-(1-hydroxycyclohexyl)peroxide, 3,4-dimethyl-3,4-diphenylhexane. Peroxy initiators are available from, for instance, Akzo-Nobel Chemicals, Inc., Chicago, Ill.

Exemplary suitable azo compound initiators include 2,2'azobis(4-methoxy-2,4-dimethylvaleronitrile, 2,2'-azobis (2,4,-dimethylvaleronitrile, 2,2'-azobisisobutyronitrile, dimethyl-2,2'-azobis(isobutyrate), 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane). Azo initiators are available from, for instance, E.I. DuPont VAZO Division, Wilmington, Del. and Wako Chemicals, Richmond, Va.

Exemplary suitable photoinitiators include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzoinmethylether, benzoinethylether, benzoinisopropylether, benzoin-n-propyl ether, benzoinisobutylether, benzoin-n-butyl-ether, benzylmethylketal, tetramethylthiuram-monosulphide, thioxanthone, 2-chlorothioxanthone, 2-methylthioxanthone, azobisisobutyronitrile, benzoinperoxide, di-tert-butylperoxide, p-isopropyl-alpha-hydroxyiosbutylphenone, alpha-hydroxyisobutylphenone, dibenzosuberone, diethylthioxanthone, 2,2,-dimethoxy-2-phenyl acetophenone and the like. The photoinitiators used in the examples include DAROCURE 1173 (Ciba-Geigy Corp., Ardsley, Pa.) whose chemical name is 2-hydroxy-2-methyl-1-phenyl-1-propanone, CHIVACURE 173 (ChivaChem) having the same chemical structure and IRGACURE 369 (Ciba-Geigy Corp.) whose chemical name is 2-benzyl-2-dimethylamino-1-(4-morpholino) butanone-1. Any combination of these or other photoinitiators may be used to optimize the efficiency of curing with different light sources whose spectral ouputs may differ.

The coating compositions of the invention may also include various additives, including colorants and pigments, which are conventionally employed in coating compositions to confer or enhance various properties thereof. Such additives can, for instance, impart color, enhance wetting of substrates, impart mar or scratch resistance, control flow and leveling properties before curing, defoam, flat or function as fillers. Typically, such additives are employed in amounts of up to about 2% by weight of the total coating composition. Where the coating composition is earmarked for cure by light energy, such as by ultraviolet light curing thereof, those additives which opacify the coating film should, of course, be avoided. A number of exemplary additives which have been found to be useful in the coating compositions of the invention are set forth in the following table.

TABLE

| FUNCTION | CHEMICAL COMPOSITION | BRAND NAME | SOURCE |
|---|---|---|---|
| Wetting Agent | Polyacrylate copolymer | BYK361 | BYK Chemie[1] |
| | Polyether siloxane | BYK UV-3510 | BYK Chemie |
| | Silicone polyether acrylate | RAD 2200N | Tego Chemie[2] |
| | Acetylenic diol | SURFYNOL 104 | Air Products[3] |
| | Ethoxylated acetylenic diol | DYNOL 604 | Air Products |
| Mar/Scratch | Silicone polyether acrylate | RAD 2250 | Tego Chemie |
| | Polyether siloxane | GLIDE 410 | Tego Chemie |
| | Silicone copolymer | COATOSIL 3500 | Crompton[4] |
| | Silicone copolymer | COATOSIL 3505 | Crompton |
| | Reactive silicone | BYK 371 | BYK Chemie |
| | Polyether siloxane | BYK UV-3510 | BYK Chemie |
| | Polethylene/monomer blend | EVERGLIDE UV691 | Shamrock[5] |
| | Wax/monomer blend | EVERGLIDE UV395D | Shamrock |
| Flow/Leveling | Silicone polyether acrylate | RAD 2250 | Tego Chemie |
| | Silicone polyether acrylate | RAD 2100 | Tego Chemie |
| | Silicone copolymer | COATOSIL 3500 | Crompton |
| | Silicone copolymer | COATOSIL 3505 | Crompton |
| | Polyether siloxane | BYK-UV3510 | BYK Chemie |
| | Polyether siloxane | BYK 333 | BYK Chemie |
| | Acetylenic diol | SURFYNOL 104 | Air Products |
| Defoaming/Deaeration | Polysiloxane and silica | FOAMEX 810 | Tego Chemie |
| | Silicone acrylate | RAD 2500 | Tego Chemie |
| | Polymer and polysiloxane | BYK 088 | BYK Chemie |
| | Polysiloxane | BYK 067 | BYK Chemie |
| Flatting Agent | Silica gel | SYLOID 7000 | Grace Davison[6] |
| | Silica gel, wax treated | GASIL UV70C | Crosfield[7] |
| | Fumed silica | ACEMATT TS-100 | Degussa-Huls[8] |
| | Treated preciptated silica | ACEMATT OK-412 | Degussa-Huls |
| | Wax/Monomer blend | EVERMATTE UV-630 | Shamrock |
| | Silica gel, wax treated | SYLOID C906 | Grace Davison |
| Filler | Magnesium silicate | MISTRON MONOMIX | LuzenacAmerica[9] |
| | Aluminum Oxide | ALUMINUM OXIDE-C | Degussa-Huls |
| Pigment | Titanium Dioxide | KRONOS 2020 | Kronos, Inc[10] |
| | Zinc Oxide | Zinc oxide | Eagle Zinc[11] |
| | Iron Oxide | SYNOX HR-1200 | Hoover Color[12] |
| | Carbon Black | MONARCH 1400 | Cabot[13] |
| | Pearlescent | MEARLIN | EnglehardCorp[14] |
| | Metallic | MD-450 | MD-BOTH Ind[15] |
| Colorant | Toluidine Red | 13–2110 HANSA Red B | Clariant[16] |
| | Diarylide (yellow) | 11–1400 NOVOPERM | Clariant |
| | Phthalocyanine (green) | 16–2035 HOSTAPERM | Clariant |
| | Dinitraniline (orange) | 12–5000 HANSA RedGG | Clariant |
| | Phthalocyanine (green) | 16–5000 HOSTAPERM | Clariant |
| | Carbazole (violet) | 14–4006 HOSTAPERM | Clariant |
| | Phthalocyanine (blue) | 14–1010 HOSTAPERM | Clariant |

Superscript number references of foregoing table
[1] Wallingford, Connecticut
[2] Hopewell, Virginia
[3] Allentown, Pennsylvania
[4] Tarrytown, New York
[5] Dayton, New Jersey
[6] Columbia, Maryland
[7] Joliet, Illinois
[8] Ridgefield Park, New Jersey
[9] Englewood, Colorado
[10] Highstown, New Jersey
[11] New York, New York
[12] Hiwassee, Virginia
[13] Billerica, Massachusetts
[14] Briarcliff Manor, New York
[15] Ashland, Massachusetts
[16] Coventry, Rhode Island The nitrocellulose based coating compositions of the invention are applied to a substrate in any conventional manner so as to produce a film over the substrate and the resulting film then cured. The application can be achieved, for instance, by such techniques as spraying, doctor blading, brushing, sponging or even by dipping of the substrate into the composition followed by draining of the so wetted substrate.

In the working examples hereof the test substrates were maple or oak veneer panels which are representative of typical wood substrates for residential, commercial and gym flooring as well as for furniture and kitchen cabints. The panels were tested in both the pre-stained and natural condition, the test results being similar for each. In the case of pre-stained panels, MINWAX Golden Oak stain (Minwax Company, Inc., Upper Saddle River, N.J.) was liberally applied to the veneer surface of the panel, the excess stain wiped off and the thusly stained panel allowed to dry for approximately 16 hours at ambient conditions prior to the application of a sealer. The sealer employed was a photocurable composition consisting of the following ingredients:

| Ingredient | Weight percent |
| --- | --- |
| Nitrocellulose H30 | 6.5 |
| SR 502 | 33.0 |
| PHOTOMER 4095 | 58.5 |
| IRGACURE 369 | 0.2 |
| CHIVACURE 173 (ChivaChem) | 1.8 |

The sealer was applied to the panels and cured under a Fusion UV Systems, Inc. (Gaithersberg, Md.) H+ bulb at a panel feed rate of 20 feet per minute. The sealed panels were then lightly sanded with 220 grit non-stearated sandpaper and the so sanded panels then dedusted with a tack cloth. The test topcoat formulations of Examples 1 through 3 and 5 through 8 were then applied at a wet thickness of from about 25 to about 50 microns and the thusly applied wet films UV cured under the same conditions as set forth above with respect to the sealer. Testing of the cured films was undertaken shortly after completion of the curing step, often within 5 to 10 minutes thereof.

EXAMPLE 1

There was charged to a mixer equipped with a cutting blade stirrer 5.15 g of the reactive diluent, ethoxylated(10) trimethylolpropane triacrylate (sold under the brand name SR502 by Sartomer) and whose homopolymer has a $T_g$ of about −19° C. and 29.9 g of the reactive diluent, ethoxylated (3)trimethylolpropane triacrylate (sold under the brand name PHOTOMER 4095 by Henkel Corporation) and whose homopolymer has a $T_g$ of about 62° C. There was then added to the stirring charge 6.19 g of a proprietary, substantially aliphatic trifunctional acrylated urethane, EBECRYL 265 (UCB Radcure), and 0.25 g of a proprietary flow and leveling aid, BYK 361 (BYK Chemie). After five minutes of stirring of these components there was added to the mixer 7.5 g nitrocellulose H30 (Hegadorn), an isopropyl alcohol wetted nitrocellulose having 12% nitration and a viscosity of less the about ½ second and the stirring continued for two hours. Then, a photoinitiator solution of 0.1 g Irgacure 369 in 0.9 g Darocure 1173 (both sold by Ciba Specialty Chemicals) was added to the mixer and the mixing continued briefly. The resulting topcoat composition had a VOC of 45 g/L. The weight percentages of the essential components of the topcoat composition were calculated to be as follows.

| Component | Weight Percent |
| --- | --- |
| Nitrocellulose | 15.38 |
| Low $T_g$ Diluent | 10.56 |
| High $T_g$ Diluent | 61.34 |
| Acrylated Urethane | 12.70 |

This composition was coated onto a sealed oak panel using a modified proofing roller and the resulting wet film topcoat UV cured in the manner outlined above.

EXAMPLE 2

To a mixer equipped with a cutting blade stirrer there was charged 8.75 g SR 502 and 22 g of an alkoxylated hexanedioldiacrylate reactive diluent (sold under the brand name HDODA by UCB Radcure) and whose homopolymer has a $T_g$ of 43° C. To the stirring reactive diluent charge there was then added 7.5 g EBECRYL 265, 0.25 g BYK 361 and 0.25 g of AIREX 920, a proprietary defoaming aid sold by Tego Chemie. After five minutes of stirring there was then added to the mixer 6.25 g of H30 nitrocellulose and the stirring continued. After two hours of stirring there was then added to the mixer 0.25 g COAT-O-SIL 3505 (a proprietary coating aid sold by Crompton Corp.), 1.25 g GASIL UV 70C (a flatting agent sold by Crosfield) and 2.5 g EVERMATTE UV 691 (a monomer dispersed wax flatting agent sold by Shamrock). After an additional ten minutes of stirring there was then added to the mixer charge a solution of 0.2 g IRGACURE 369 in 0.9 g DAROCURE 1173. The resulting topcoat composition had a VOC of 39 g/L. The weight percentages of the essential components of the topcoat composition were calculated to be as follows.

| Component | Weight Percent |
| --- | --- |
| Nitrocellulose | 14.04 |
| Low $T_g$ Diluent | 19.66 |
| High $T_g$ Diluent | 49.44 |
| Acrylated Urethane | 16.85 |

The topcoat composition was applied to a sealed maple panel using a wire wound rod and the resulting wet film coating UV cured in the manner outlined above.

EXAMPLE 3

To a mixer equipped with a cutting blade stirrer there was charged 7.5 g of SR 502 and 22 g HDODA. To this stirring reactive diluent charge there was then added 8.75 g EBECRYL 265, 0.25 g BYK and 0.25 g AIREX 920. After five minutes of stirring, 6.25 g nitrocellulose H30 was added to the mixer and stirring of its contents continued for two hours. Then, 0.25 g COAT-O-SIL 3505, 0.5 g UV 70C and 1.25 g UV 691 were added to the stirring charge and stirring continued for an additional ten minutes. There was then further added a solution of 0.2 g IRGACURE 369 in 0.9 g DAROCURE 1173. The resulting topcoat composition had a VOC of 39 g/L. The weight percentages of the essential components of the topcoat composition were calculated to be as follows.

| COMPONENT | WEIGHT PERCENT |
| --- | --- |
| Nitrocellulose | 14.04 |
| Low $T_g$ Diluent | 16.85 |
| High $T_g$ Diluent | 49.44 |
| Acrylated Urethane | 19.66 |

This topcoat coating composition was applied to a sealed maple panel using a wire wound rod and the resulting topcoat wet film UV cured in the manner outlined above.

EXAMPLE 4

This example discloses a thermally cured coating composition within the scope of the invention. Into a mixer equipped with a cutting blade there is charged 7.5 g of SR 502 and 29.9 g of PHOTOMER 4095. To these stirring reactive diluents there is then added 6.19 g EBECRYL 265 and 0.25 g BYK 361. After about 5 minutes of stirring there is added to the mixer 7.5 g nitrocellulose H30 and stirring continued for 2 hours. Then, 2 g of a 10 wt % solution of azobisobutyonitrile in HDODA is added to the stirring mixture and stirring continued for an additional 10 minutes.

The resulting topcoat composition has a VOC of 45 g/L. The weight percentages of the essential components of this topcoat composition are calculated to be as follows.

| COMPONENT | WEIGHT PERCENT |
| --- | --- |
| Nitrocellulose | 14.18 |
| Low $T_g$ Diluent | 14.18 |
| High $T_g$ Diluents | 59.93 |
| Acrylated Urethane | 11.70 |

This topcoat composition is coated onto a sealed oak panel using a modified proofing roller and the panel placed in an oven held at a temperature of 200° C. for 10 minutes. The resulting thermally cured topcoat is found to provide good protective qualities for the underlying oak veneer substrate and, further, has good aesthetic properties.

COMPARATIVE EXAMPLE 5

There was charged to a mixer equipped with a cutting blade stirrer 7.5 g SR 502, 16 g HDODA and 22 g PHOTOMER 4095. To this stirring charge of reactive diluents there was then added 10 g EBECRYL 265, 0.25 g BYK 361 and 0.25 g AIREX 920. After about five minutes of stirring, there was further added 0.25 g COAT-O-SIL 3505, 1.25 g UV 70C and 2.5 g UV 691. After an additional ten minutes of stirring there was added a solution of 0.1 g IRGACURE 369 in 0.9 g DAROCURE 1173. The VOC of this composition was 39 g/L. However, unlike the coating compositions of the invention, the composition of this example contained no nitrocellulose. The weight percentages of the essential components of the compositions of the present invention were calculated to be as follows.

| Component | Weight Percent |
| --- | --- |
| Nitrocellulose | 0 |
| Low $T_g$ Diluent | 13.51 |
| High $T_g$ Diluents | 68.47 |
| Acrylated Urethane | 18.02 |

The composition was topcoated onto a sealed maple panel using a wire wound rod and the resulting wet film UV cured in the manner outlined above.

COMPARATIVE EXAMPLE 6

There was charged to a mixer equipped with a cutting blade stirrer 7.25 g SR 502, 11 g PHOTOMER 4095 and 15.5 g HDODA. Then, 10 g EBECRYL 265, 0.25 g BYK 361 and 0.25 g AIREX 920 were added to the stirring diluent charge. After five minutes of stirring there with then added 0.75 g nitrocellulose H30 and the stirring continued for two hours. Then, 0.25 g COAT-O-SIL 3505, 1.25 g UV 70C and 2.5 g UV 691 were added to the stirring charge and the stirring continued for an additional ten minutes. Then, a solution of 0.1 g IRGACURE 369 in 0.9 g DAROCURE 1173 was stirred into the charge. The resulting coating composition had an insufficient nitrocellulose content to fall within the scope of the present invention. The weight pecentages of the essential components of the present invention were calculated to be as follows.

| Component | Weight Percent |
| --- | --- |
| Nitrocellulose | 1.68 |
| Low $T_g$ Diluent | 16.29 |
| High $T_g$ Diluents | 59.55 |
| Acrylated Urethane | 22.47 |

This coating composition was coated onto a sealed maple panel using a wire wound rod and the resulting wet film UV cured in the manner outlined above.

COMPARATIVE EXAMPLE 7

To a mixer equipped with a cutting blade stirrer there was charged 99 g SR 502 and 24.75 g PHOTOMER 4095. To this reactive diluent charge there was added 0.75 g BYK 361. After five minutes of stirring there was then added to the mixer 22.5 g nitrocellulose H30 and the stirring continued for two hours. Then a solution of 0.1 g IRGACURE 369 in 0.9 DAROCURE 1173 was stirred into the charge. Unlike the coating compositions of the present invention the composition of this example contained no acrylated urethane component. The weight percentages of the essential components of the present invention were calculated to be as follows.

| Component | Weight Percent |
| --- | --- |
| Nitrocellulose | 15.38 |
| Low $T_g$ Diluent | 67.69 |
| High $T_g$ Diluent | 16.92 |
| Acrylated Urethane | 0 |

The composition was coated onto a sealed maple panel using a wire wound rod and the resulting wet film thereof UV cured in the manner outlined above.

COMPARATIVE EXAMPLE 8

To a mixer equipped with a cutting blade stirrer there was charged 7.22 g SR 502, 31.9 g PHOTOMER 4095 and 2.06 g of pentaerythritol tetracrylate (PETA K, UCB Radcure) a reactive diluent whose homopolymer has a $T_g$ of 103° C. To this stirring reactive diluent charge there was added 0.25 g BYK 361. After five minutes of stirring there was then added to the charge 7.5 g nitrocellulose H30 and stirring continued for two hours. Then a solution of 0.1 g IRGACURE in 0.9 g DAROCURE 1173 was stirred into the charge. Unlike the coating compositions of the present invention the composition of this example contained no acrylated urethane component. The weight percentages of the essential components were calculated to be as follows.

| Component | Weight Percent |
| --- | --- |
| Nitrocellulose | 15.41 |
| Low $T_g$ Diluent | 14.83 |
| High $T_g$ Diluents | 69.76 |
| Acrylated Urethane | 0 |

The composition was coated onto a sealed maple panel using a wire wound rod and the resulting wet film thereof UV cured in the manner outlined above.

COMPARATIVE EXAMPLE 9

This example provides a representative, commercially available, solvent based catalyzed nitrocellulose coating composition. The composition is manufactured by Sherwin-Williams Co. of Cleveland, Ohio under the SHER-WOOD KEMVAR brand name. As reported by the manufacturer, this coating composition has a VOC of 501–625 g/L and a dry time of 10–20 minutes under ambient forced air.

COMPARATIVE EXAMPLE 10

This example provides a representative, commercially available, acrylic waterborne coating composition manufactured by Sherwin-Williams Co. under the brand name SHER-WOOD HI BILD lacquer. As reported by the manufacturer this composition has a VOC of 633 g/L and a dry time of 60 minutes in forced hot air.

COMPARATIVE EXAMPLE 11

This example provides a representative, commercially available solvent based polyurethane coating composition manufactured under the brand name MINWAX FAST DRYING POLYURETHANE by Minwax Co., Upper Saddle River, N.J. As reported by the manufacturer this composition has a VOC of greater than 350 g/L and a dry time of 8 hours in ambient air.

EXAMPLE 12

There is provided below a comparison of the dry times and VOC values of the coating compositions of the foregoing examples. Dry time is defined as the length of time required to through-dry a coating and the dry times reported below are either determined by the method of ASTM D1640 or, in the cases of the commercially available coatings of Comparative Examples 9–11, as reported by the manufacturers. Similarly, the VOC data provided below is either calculated from the raw components or, in the cases of the coatings of Comparative Examples 9–11, as reported by the manufacturers.

| Example No. | Coating Type | Dry Time | VOC |
|---|---|---|---|
| 1 | UV curable | Immediate upon cure | 45 g/L |
| 2 | " | " | 39 g/L |
| 3 | " | " | 39 g/L |
| 4 | Thermal cure | 10 minutes | Less than 50 g/L |
| C5 | UV curable | Immediate upon cure | 39 g/L |
| C6 | " | " | Less than 50 g/L |
| C7 | " | " | " |
| C8 | " | " | " |
| C9 | Catalyzed NC | 10–20 minutes | 501–624 g/L |
| C10 | Waterborne Acrylic | 60 minutes | 633 g/L |
| C11 | Solvent based PU | 8 hours | 350 g/L |

This data clearly discloses that the coating compositions of the invention have a substantial advantage over the commercially available coating compositions of Comparative Examples 9–11 in both dry times and VOC. Lower dry times permit increases in throughput during manufacturing and lower VOC values are environmentally important in that the amount of pollutants that are either released or recovered is reduced.

EXAMPLE 13

Topcoat coatings prepared from the compositions of Examples 1–3 and 5–8 are tested for pencil hardness by the method of ASTM D3363 and for general appearance. General appearance was judged visually for clarity, color and distinctness of image (DOI). The resulting data is reported below.

| Example No. | Pencil Hardness | Appearance |
|---|---|---|
| 1 | 5H | Excellent gloss and clarity |
| 2 | 5H | Good gloss and clarity |
| 3 | 5H | Good gloss and clarity |
| C5 | less than 3H | Hazy and mottled |
| C6 | 3H–5H | Moderately hazy and mottled |
| C7 | 3H | Good gloss and clarity |
| C8 | less than 3H | Acceptable |

This data clearly demonstrates that nitrocellulose based UV curable coating compositions prepared in accordance with the present invention exhibit superior hardness properties and improved appearance over similar compositions lying outside the scope of the invention.

While the present invention has been described and exemplified in relation to various preferred non-limiting embodiments, it is to be understood that various modifications will become apparent to those of ordinary skill in the art without departing from the essential scope and spirit of the invention. For example, while wood substrates have been expressly disclosed, it is obvious that the coating compositions of the invention can also be beneficially applied to other substrate materials, such as metals and compatible plastics. Accordingly, it is expressly intended, and should be so understood, that the scope of the invention is to be limited only by the appended claims.

What is claimed is:

1. A nitrocellulose based coating composition comprising the following components:

A) between about 3 and about 25 weight percent nitrocellulose;

B) between about 10 and about 50 weight percent of a polymerizable reactive diluent whose homopolymer has a $T_g$ of less than about 25° C.;

C) between about 25 to about 75 weight percent of a polymerizable reactive diluent whose homopolymer has a $T_g$ of greater than about 25° C.; and D) between about 5 and about 40% weight percent of acrylated urethane.

2. The nitrocellulose based coating composition of claim 1 additionally comprising an initiator.

3. The nitrocellulose based coating composition of claim 2 wherein said initiator is present in the amount of between about 0.5 and about 5 weight percent of the total composition.

4. The nitrocellulose based coating composition of claim 2 wherein said initiator is a thermal initiator.

5. The nitrocellulose based coating composition of claim 4 wherein said thermal initiator is selected from the group consisting of azo and peroxy compounds.

6. The nitrocellulose based coating composition of claim 2 wherein said initiator is a photoinitiator.

7. The nitrocellulose based coating composition of claim 1 wherein said nitrocellulose component is between about 10 and about 12.5% nitrated.

8. The nitrocellulose based coating composition of claim 1 wherein said nitrocellulose component has an ASTM Specification D301-50 viscosity of less than about 20 seconds.

9. The nitrocellulose based coating composition of claim 8 wherein said nitrocellulose component has a viscosity of less than about 1 second.

10. The nitrocellulose based coating composition of claim 1 wherein said nitrocellulose component is between about 10 and about 12.5% nitrated and has an ASTM Specification D301-50 viscosity of less than about 20 seconds.

11. The nitrocellulose based coating composition of claim 1 said acrylated urethane component has from 1 to 10 acrylic or methacrylic functionalities.

12. The nitrocellulose based coating composition of claim 10 wherein said acrylated urethane component has from 2 to 5 functionalities.

13. The nitrocellulose based coating composition of claim 1 wherein said acrylated urethane component has 3 functionalities.

14. The nitrocellulose based coating composition of claim 1 where said acrylated urethane component is substantially aliphatic.

15. A protective film comprising the cured reaction product of a composition comprising the following components:
  A) between about 3 and about 25 weight percent nitrocellulose;
  B) between about 10 and about 50 weight percent of a polymerizable reactive diluent whose homopolymer has a $T_g$ of less than about 25° C.;
  C) between about 25 and about 75 weight percent of a polymerizable reactive diluent whose homopolymer has a $T_g$ of greater than about 25° C.; and
  D) between about 5 and about 40 weight percent of acrylated urethane.

16. The protective film of claim 15 wherein said composition additionally comprises a thermal initiator and said film is thermally cured.

17. The protective film of claim 15 wherein said composition additionally comprises a photoinitiator and said film is light cured.

18. The protective film of claim 17 wherein said film is cured by ultraviolet light radiation.

19. The protective film of claim 15 having an ASTM D3363 hardness value of at least about 5H.

20. The protective film of claim 15 applied to a wood substrate.

* * * * *